United States Patent
Evans et al.

(10) Patent No.: US 7,415,570 B2
(45) Date of Patent: Aug. 19, 2008

(54) TAPE DRIVE APPARATUS HAVING A PERMANENT OPTICAL STORAGE DEVICE PORT

(75) Inventors: Rhys Wyn Evans, Wales (GB); Alastair Michael Slater, Charlton Park Malmesbury (GB); Duncan Wakelin, Bishopston Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 10/965,200

(22) Filed: Oct. 15, 2004

(65) Prior Publication Data
US 2005/0120166 A1 Jun. 2, 2005

(30) Foreign Application Priority Data
Oct. 30, 2003 (GB) .................... 0325303.6

(51) Int. Cl.
G06F 12/00 (2006.01)
G06F 12/16 (2006.01)
(52) U.S. Cl. ...................... 711/111; 711/162
(58) Field of Classification Search ............... 711/111, 711/113, 162; 714/5, 15, 42
See application file for complete search history.

(56) References Cited

U.S. PATENT DOCUMENTS
6,701,450 B1 * 3/2004 Gold et al. .................. 714/5
2002/0163760 A1 11/2002 Lindsey
2002/0194528 A1 12/2002 Hart

FOREIGN PATENT DOCUMENTS
WO WO 00/08561 2/2000

* cited by examiner

Primary Examiner—Jack Lane

(57) ABSTRACT

A tape drive apparatus includes a data transfer apparatus for transferring data to and from a tape media loaded in the tape drive apparatus, a first port for communicating with the data transfer apparatus in a tape drive mode, a second port for communicating with the data transfer apparatus in an optical storage device mode, and an emulation apparatus for permanently emulating an optical storage device at the second port for enabling an external device to access the data transfer apparatus, via the second fort, in the optical storage device mode.

18 Claims, 5 Drawing Sheets

TAPE DRIVE APPARATUS HAVING A PERMANENT OPTICAL STORAGE DEVICE PORT

RELATED APPLICATIONS

The present application is based on, and claims priority from, GB Application Ser. No. 0325303.6, filed Oct. 30, 2003, the disclosure of which is hereby incorporated by reference herein in its entirety.

1. Field of the Invention

The present invention relates to the field of data backup and recovery, and more particularly to tape drives.

2. Background and Prior Art

It is known to backup data stored on primary storage, such as a hard disk, of a computer system in order to protect against a disaster that might otherwise irrecoverably destroy all or part of the data. Disasters for example may be fire, flood, computer virus or simply accidental deletion of data. One of the main reasons for using magnetic tape as the backup storage medium is that it provides a stable, reliable and relatively cheap option for storing large volumes of backed-up data.

Backup application software which executes on the computer system typically provides the functions for enabling such computer system data to be both backed-up to, and restored from, tape media, which is written to and read from a tape drive. Well-known backup application software includes 'Replica™' from Stac, 'ArcServe™' from Computer Associates, 'BackupExec™' from Veritas and 'Omniback™' from HP. Well-known tape drives include DDS™ and LTO™ compliant tape drives, both available from HP.

In the event of a disaster, such as hard disk failure or even system destruction, typically, a priority is to rebuild a working system as soon as possible. This requires the computer hardware to be restored to the same state as it was before the disaster, which can take hours or even days, even before the file system can be restored. Generally, a significant amount of human intervention is required to complete this process.

In order to reduce the time and human intervention overhead of restoring a computer system after a disaster a backup application software provides a so-called disaster recovery (DR) solution, which enables a computer system to be restored in an expedited manner to a state which existed before a disaster occurred. Such a scheme typically involves at least installing and configuring a minimal operating system, tape drivers and the backup application software (or the requisite parts thereof) itself.

Known DR solutions typically require a user to generate a set of DR floppy disks. The DR floppy disks may be used to boot the computer system, when it is not possible to boot from the hard disk drive, and execute application software for recovering a backed-up copy of the file system from tape media. The DR floppy disks typically load and execute a minimal version of the operating system along with components of application software comprising DR functionality, thus providing sufficient functionality, for example, for the computer to build new disk partitions, access a tape drive and restore the data from tape media.

The DR operating system is required to reflect the exact hardware configuration of the computer system on which it is to be installed, otherwise it would not be possible to communicate with storage devices such as tape drives.

Typically, therefore, DR floppy disks need to be regenerated by a user whenever the system hardware configuration changes, and particularly when a SCSI (Small Computer Systems Interface) configuration changes. For example, if a new SCSI Host Bus Adaptor (HBA) is added to a server, with a respective new device driver, this device driver needs to be added to the DR floppy disks so that the new SCSI HBA is recognised when rebuilding the computer system.

A reason why DR floppy disks are used is that a floppy disk drive is one of the standard 'initial program load devices' (IPLD), which practically every PC is configured to 'boot' from. Herein, 'standard' as applied to an IPLD, implies that the PC is physically programmed to recognise the device for the purposes of booting. Currently, other standard IPLDs, sometimes known as BAIDS (BIOS Aware Initial Program Load Devices), include the first hard disk drive in a PC and, more recently, the first CD-ROM drive in a PC. Generally, however, an IPLD can be virtually any device that has the ability to load and execute a PC operating system.

It is known to boot from a CD-ROM drive, as long as the CD-ROM complies with the ISO 9660 CD-RO standard, as extended by the 'El Torito' Bootable CD-ROM Format Specification, Version 1.0, Jan. 25, 1995, created jointly by IBM Corporation and Phoenix Technologies Ltd. Booting from CD-ROM in a similar manner is also considered in detail in U.S. Pat. No. 5,727,213. As described, to boot from CD-ROM, a PC's BIOS (basic input/output system) needs to specifically support reading boot record data from a CD-ROM, typically, as well as from a floppy disk or hard disk. U.S. Pat. No. 5,727,213 also proposes that tape media may also serve as a boot source, subject to the PC BIOS being modified to detect and read boot record data from a tape media. To date, however, PC BIOS standards do not support booting from tape media.

In a system which is bootable from a CD-ROM, U.S. Pat. No. 5,727,213 specifies that, to read boot record data from a CD-ROM, read commands directed to the floppy disk drive need to be re-directed to the CD-ROM drive during a read data part of the boot process. In addition, a modified SCSI driver of the PC needs to convert the 512 byte sectors conventionally used by hard disk and floppy disk into 2 Kbytes sectors conventionally used by a CD-ROM drive.

In view of the possibility of booting from CD-ROM, it would obviously also be possible to generate one or more DR CD-ROMs to replace the DR floppy disks. However, there would be little advantage in adopting this approach, and a significant cost increase. In particular, it would still be onerous for the user to have to generate, maintain and keep safe the DR CD-ROMs.

WO00/08561 shows a tape drive configured to operate as a bootable device for a PC. The tape drive has two modes of operation: the first mode in which it operates as a normal tape drive and the second in which it emulates a bootable CD-ROM drive. US 2002/0163760 A1 shows a similar tape drive.

FIG. 1 shows a block diagram of such a prior art tape drive being coupled to a PC. The PC 100 is either a MS-DOS based machine, or a Windows NT or Windows 95/98 machine.

The tape drive 140 is, for example, a well-known DDS (Digital Data Storage) tape drive, DLT (Digital Linear Tape) tape drive or other device for transferring data to tape.

As shown in FIG. 1, the PC 100 includes a CPU 105 (Central Processing Unit), which is in communication, via a bus 110, with ROM 115 (Read Only Memory), RAM 120 (Random Access Memory) and an I/O (Input/Output) subsystem 125.

The I/O subsystem 125 connects the PC 100 to a number of storage devices, namely, a floppy disk drive 135 and, via a SCSI HBA 128, a hard disk drive 130 and the tape drive 140. The hard disk drive 130 and floppy disk drive 135 are represented as internal devices of the PC 100, whereas the tape drive 140 is represented as an external device, in this arrangement, although it could alternatively be an internal device.

In practice, the bus 110 may comprise multiple busses and respective bus subsystems; for example, host bus, PCI bus, EISA bus, or another bus type.

As also shown in FIG. 1, a typical tape drive 140 includes a host interface 145 coupled to port 146 for controlling transfer of data between the tape drive 140 and the PC 100. Control signals received from the PC 100 are passed to a controller 150, which controls the operation of all components of the tape drive 140. The controller 150 typically consists a microprocessor, for example a Motorola 68000 series microprocessor, a micro-controller (as illustrated in the present embodiment) controlled by firmware stored in ROM 185, or an ASIC (Application Specific Integrated Circuit).

For a data backup operation, in response to receipt by the host interface 145 of data write signals from the PC, the controller 150 controls the tape drive 140 to write data to tape, comprising the steps: the host interface 145 receiving data from the PC 100 and passing it to the formatter 155; the formatter formatting the data, for example by compressing the data and adding error correction and detection codes, and storing the formatted data in a buffer 160, comprising, for example, a bank of 8 Mbytes of RAM; when appropriate (for example, when the buffer is nearly full), a read/write block reading the formatted data from the buffer 160 and converting the data into electrical signals suitable for driving magnetic read/write heads 170, which write the data to tape media 175 in known fashion.

The tape media 175 is mounted in a tape mechanism 180, which loads and ejects the tape media 175 and winds the tape media 175 forwards or backwards as required for reading and writing data. In a DDS tape drive, the read/write heads 170 are mounted on a helical scanning drum, which rotates to sweep the heads past the tape in a motion oblique to the direction of travel of the tape.

For a data restore operation, in response to read signals received by the host interface 145 from the PC 100, the controller 150 controls the tape drive to return the data to the PC 100, comprising the steps: the heads 170 reading data signals from the tape media 175; the read/write block 165 converting the signals into digital data representation and storing the data in the buffer 160; the formatter 155 reading the data from the buffer 160, processing the data to remove errors and decompressing the data to be passed on to the host interface 145; and the host interface returned the data to the PC 100.

The host interface 145, formatter 155 and read/write blocks typically each comprise one or more appropriately programmed ASICs.

PC 100 communicates with the tape drive 140 using one of the well-known standard SCSI protocols, such as SCS12. Accordingly, the host interface 145 comprises an appropriate SCSI adaptor. Alternatively, other protocols such as EIDE or Fibre Channel, could be used. The tape drive 140 has firmware 185, which controls the operation of the tape drive.

The firmware 185 may be modified by writing a new set of instructions to the existing ROM (if the ROM is an EEPROM) using a standard firmware update process, which is well known and will, thus, not be described herein. Alternatively, the ROM may simply be replaced with one containing the new instructions. In this way, it is a relatively simple process to modify the behaviour of a standard tape drive 140.

Firmware 185 provides both a 'Normal Mode' of operation, in which the tape drive 140 behaves as a tape drive 140, and a 'DR Mode' of operation, in which the tape drive 140 is arranged to emulate a CD-ROM drive. The CD-ROM drive emulation is achieved in part by configuring the tape drive 140 to identify itself to the PC 100 as a CD-ROM drive and also by modifying a SCSI command set in the tape drive 140 to emulate the SCSI command set of a CD-ROM drive. With the ability to emulate a CD-ROM drive, the tape drive 140 can act as a IPLD, without the need to modify existing PC BIOS standards, PC hardware or PC operating systems.

Whether the tape drive 140 operates in Normal Mode or DR Mode is determined by user selection. The user selection of mode may be performed without the need for any additional tape drive hardware, by using the tape drive Eject button; if the tape drive 140 is powered on the Eject button held down, the DR Mode of operation is selected, otherwise the Normal Mode is selected. Alternatively the tape drive may have an extra selection button for activation of the DR Mode. As a further alternative an external mode choice command is entered into the tape drive, e.g. a SCSI mode select command.

This selection function is achieved by the tape drive's firmware 185 which checks the status of the Eject button during a power-on self-tests sequence. Alternatively, DR Mode can be selected by holding the Eject button down for a long time period (such as five seconds), when the tape drive 140 is already powered on, by the firmware 185 which checks the length of the period the Eject button is held down to determine whether the operation is an eject or the user selecting DR Mode. Various other means for selecting mode could be employed, for example by providing a specific DR button or switch on the tape drive 140.

FIG. 2 illustrates the steps involved in setting the tape drive of FIG. 1 into 'DR Mode' and booting the PC from the tape drive.

In step 500, a user initiates DR Mode in the tape drive 140 by holding down the Eject button when the power is switched on. As a result, the tape drive 140 displays an appropriate signal on the front panel (not shown) of the tape drive; for example, by setting one or more front panel LEDs to flash or generating a graphical message on an LCD display. The tape drive 140 then continues as follows.

In step 505, the tape drive 140 determines whether tape media 175 is present in the tape drive 140 in normal fashion, and generates an appropriate warning signal to the user if not, in step 510. While waiting for the media to be loaded and while checking the media for DR capability, the tape drive 140 is arranged to respond to a Test Unit Ready command from the PC 100 by returning 'CHECK CONDITION', with sense key 'NOT READY' (0x02) and extended sense 'LOADING' (0x0401). This in fact may be a false response, which is intended to trick the BIOS into waiting for the tape to load (if it has not done so already), which can take up to thirty seconds after being inserted into the tape drive after power-on.

In this case, if a true response were returned before a tape had been loaded (a true response including extended sense 'MEDIA NOT LOADED'), the BIOS would move straight on from the tape drive in an attempt to find a different IPLD. In other words, DR would not work. The false response causes the BIOS to wait at least 60 seconds before timing out after waiting for the tape drive (which is emulating a CD-ROM drive) to read the first block. This time is sufficient for the tape media to be inserted, loaded and checked for DR capability. The ability to generate a false response is a key requirement of tape drive operation when the tape drive 140 is an 'internal' tape drive, which shares the power of the PC. In the absence of this feature, it is highly likely that than 'internal' tape drive would not be able to provide the DR Mode. Obviously, the feature is not such an issue with an 'external' tape drive, which has its own power supply and can be switched on and prepared in advance of switching the PC on.

If, or once, tape media 175 is loaded by the user, in step 515, the firmware 185 controls the tape drive 140 to check to see if the tape media 175 is valid DR tape media. This is achieved by rewinding the tape media 175, reading from the beginning of the tape media 175 and searching for an appropriate Boot System Identifier entry in a Boot Record Volume Description of a CD-ROM image.

If the tape media 175 is found to be DR media then, in step 525, the tape drive 140 switches to DR Mode by enabling the appropriate CD-ROM SCSI command set and displaying an appropriate DR Mode signal on the front panel. Otherwise, in step 520, the tape drive 140 ejects the tape media 175 and another appropriate warning signal is provided via the front panel display, in step 510.

The tape drive 140 remains in 'DR Mode' until one of the following conditions are met: tape drive 140 is power cycled; backup application software sends a DR Mode page command to disable DR Mode; user manually ejects the loaded DR capable media; or, the tape drive 140 receives a SCSI bus rest after 100 CD-ROM blocks or more have been read while in DR Mode.

When existing 'DR Mode', the emulated CD-ROM SCSI commands are disabled and the tape drive 140 reverts to Normal Mode; the tape drive 140 then appears to be in the same state as it had just been powered on.

In step 530, the PC 100 is booted and carried out the steps defined by the BIOS program, as described above. In particular, in step 535, the PC 100 searches for an IPLD, which contains a bootable file system. The typical BIOS boot sequence is:
1. search for a floppy disk drive containing a bootable floppy disk—if found, then attempt to boot from this, otherwise
2. search for a CD-ROM drive containing bootable CD-ROM media—if found, then attempt to boot from this, otherwise
3. if no bootable floppy disk or CD-ROM drive is found, then attempt to boot from hard disk drive.

Assuming no other IPLDs containing bootable data are found, the PC 100 accesses the tape drive 140, in step 540, and issues a SCSI 'INQUIRY'. In response, in step 545, the tape drive 140, operating in DR Mode, returns a Standard Inquiry Data CDB (Control Data Block) having a Peripheral Device Type value of 5 (CD-ROM device type) rather than 1 (tape drive device type), which identifies the tape drive 140 as a CD-ROM drive. Then, in step 550, the PC 100 reads the beginning of the CD-ROM image from the tape drive 140 to check for bootable CD-ROM file system, and, when returned by the tape drive 140 in step 555, the PC 100 designates the tape drive 140 as the boot path in step 560.

This means that the PC 100 will boot from the CD-ROM image in the tape drive 140 path, even if there are other, real CD-ROM drive devices present in the system (as long as they do not contain a bootable CD-ROM). The only other requirement for the DR operation to function is that the PC BIOS, or SCSI host adaptor BIOS, supports bootable CD-ROM drives (which is typically the case in all modern SCSI host adaptor cards or motherboard chipsets).

In step 565, the PC 100 reads the CD-ROM image, which is returned by the tape drive 140 in step 570. The operating system files are read directly into RAM 120 and are executed by the CPU 105 in order to configure the PC, including to be able to access a tape drive 140. The backup application software files are read and stored on the hard disk, form where they can be executed.

Next, in step 575, the PC 100 executes the backup application software for DR and issues a SCSI Mode Select command that accesses the DR Mode page of the tape drive to terminate DR Mode and begin Normal Mode, to continue with normal tape drive operation.

In step 580, the tape drive 140 reverts to Normal Mode, the buffer 160 is purged and the tape media 175 is allowed to be physically accessed by standard tape drive commands (i.e. Locate, Space, Read, etc). This allows the PC's recovery to proceed as if it had initially booted from DR floppy disk.

Finally, in step 585, the PC 100 continues to retrieve from the tape drive 140 the backed-up data set stored on tape media 175 until the whole PC 100 file system is restored to hard disk drive 130. Thereafter, the re-built PC 100 can boot from the hard disk drive 130 as normal.

SUMMARY OF THE INVENTION

According to one aspect of the invention a tape drive apparatus is provided that has a first port for communicating with the tape drive apparatus in a tape drive mode and a second port for communicating with the tape drive apparatus in an optical storage device mode. For example, the tape drive apparatus behaves like a tape drive at the first port and like an optical storage device, such as a CD-ROM or DVD, at the second port.

This is particularly advantageous for the purpose of disaster recovery. In the case of disaster recovery it is no longer necessary to manually switch the tape drive apparatus into disaster recovery mode. Rather the optical storage device which is emulated by the tape drive apparatus for the second port is identified as a bootable device and bootable data is loaded from the second port. This has the advantage that a user does not need to be instructed to manually switch the tape drive apparatus into disaster recovery mode when a disaster recovery procedure is to be performed.

According to another aspect of the invention a common physical port is utilised both for the tape drive mode and the disaster recovery mode. In this instance the tape drive apparatus has a first logical unit (LUN) that provides the tape drive mode and a second LUN that provides a permanent emulation of an optical storage device, such as CD-ROM or DVD. This has the advantage that the number of physical ports can be reduced. Preferably the first and second LUNs are provided by means of respective firmware instructions of the tape drive apparatus. Each LUN has an associated logical unit number that identifies the respective LUN as a sub-element within e.g. a SCSI target device. This way each LUN provides a logical port that can be accessed through the common physical port.

In accordance with a preferred embodiment of the invention a tape library comprises at least one tape drive apparatus of the invention. Thus, use of a tape drive as a bootable device without any manual intervention by a user is facilitated. In a typical tape library the individual tape drives are often not conveniently accessible. In particular the eject button of a tape drive in a tape library may not be conveniently accessible by a user.

In accordance with a further preferred embodiment of the invention the emulation of the optical storage device mode for the second port of the tape drive apparatus is performed by firmware. This has the advantage that only a minimal modification of the hardware of a prior art tape drive as shown in FIG. 1 is required, i.e. adding an additional port, as the permanent optical storage device emulation is performed by the firmware.

In accordance with a further preferred embodiment of the invention the ports of the tape drive apparatus are compliant with the FibreChannel standard for coupling of the tape drive apparatus to a storage area network (SAN). The firmware of the tape drive is configured such that it reports itself as an optical storage device on one FibreChannel port and as tape drive on another FibreChannel port. If a tape media with a valid bootable image is loaded in the tape drive apparatus, the tape drive apparatus reports itself as the optical storage device with bootable medium present.

This enables the host computer which is coupled to the tape drive apparatus via the storage area network to boot off the bootable image to restore its operating system and data. Further, coupling of the tape drive apparatus to a storage area network via Fibre Channel has the advantage that the storage area network can be configured by a user such that different host computers are able to access the optical storage device emulation, if required.

In an aspect, a tape drive apparatus comprises a data transfer apparatus for transferring data to and from a tape media loaded in the tape drive apparatus, a first port for communicating with the data transfer apparatus in a tape drive mode, a second port for communicating with the data transfer apparatus in an optical storage device mode, and an emulation apparatus for permanently emulating an optical storage device at the second port for enabling an external device to access the data transfer apparatus, via the second port, In the optical storage device mode.

In a further aspect, a computer-readable physical memory stores therein a computer program for controlling operation of a tape drive, the tape drive having first and second ports, the computer program comprising, instructions executable by a processor for permanently providing a tape drive Interface at the first port and for permanently providing an optical storage device interface at the second port.

In a further aspect, a non-volatile memory component comprises firmware for controlling a tape drive, the tape drive having first and second ports, the firmware comprising instructions executable by a processor for providing a tape drive interface at the first port and for permanently providing an optical storage device interface at the second port.

In a further aspect, a tape library comprises a plurality of tape drives, at least one of the tape drives having a first port for providing a tape drive interface and a second port for permanently providing an optical storage device interface.

In a further aspect, a tape drive comprises a first port for providing a tape drive interface and a second port for permanently providing an optical storage device interface, and instructions executable by a processor to provide bootable data read from a tape media loaded in the tape drive in response to an inquiry command received at the second port.

In a further aspect, a tape drive apparatus comprises a data transfer apparatus for transferring data to and from a tape media loaded in the tape drive apparatus, first and second logical units, and at least one physical port for communication with the data transfer apparatus, the first logical unit providing a tape drive mode at said at least one physical port for enabling an external device to access the data transfer apparatus as a tape drive, the second logical unit providing a permanent emulation of an optical storage device at said at least one physical port for enabling the or another external device to access the data transfer apparatus as an optical storage device.

BRIEF DESCRIPTION OF THE DRAWINGS

In the following a preferred embodiment of the invention will be described, by way of example only, and with reference to the drawings in which.

DETAILED DESCRIPTION

Figure 3:
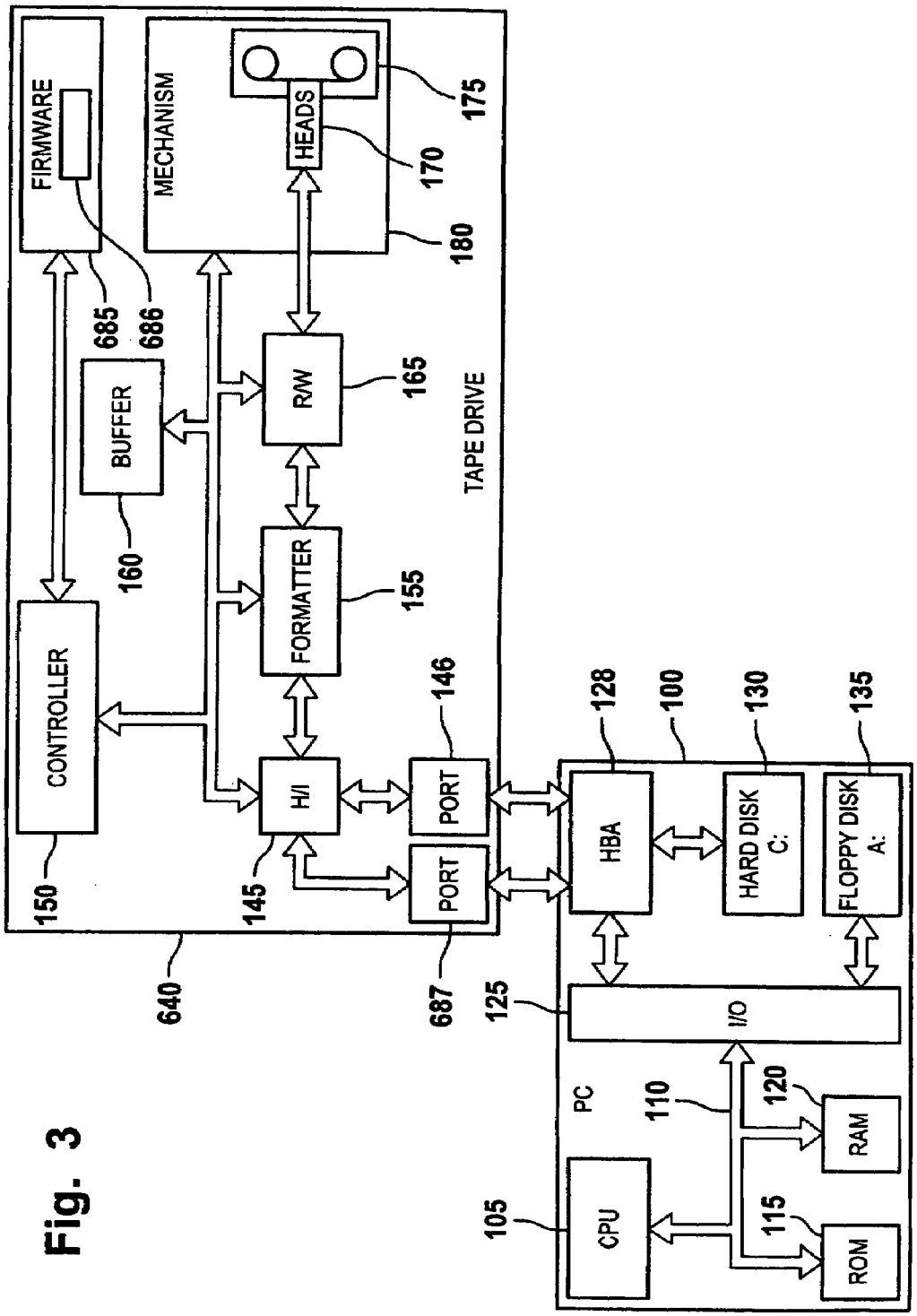
FIG. 3 is a schematic block diagram showing a computer and an embodiment of a tape drive apparatus of the invention.

FIG. 3 shows tape drive 640. Tape drive 640 has host interface 145 which is coupled to port 146, controller 150, formatter 155, buffer 160, read/write block 165, read/write heads 170 of tape mechanism 180 in which tape media 175 can be inserted, host interface 145, port 146, controller 150, formatter 155, buffer 116, read/write block 165, read/write heads 170, tape mechanism 180 and tape media 175. These elements of tape drive 640 can have substantially the same design as the respective elements shown in FIG. 1.

Figure 1:
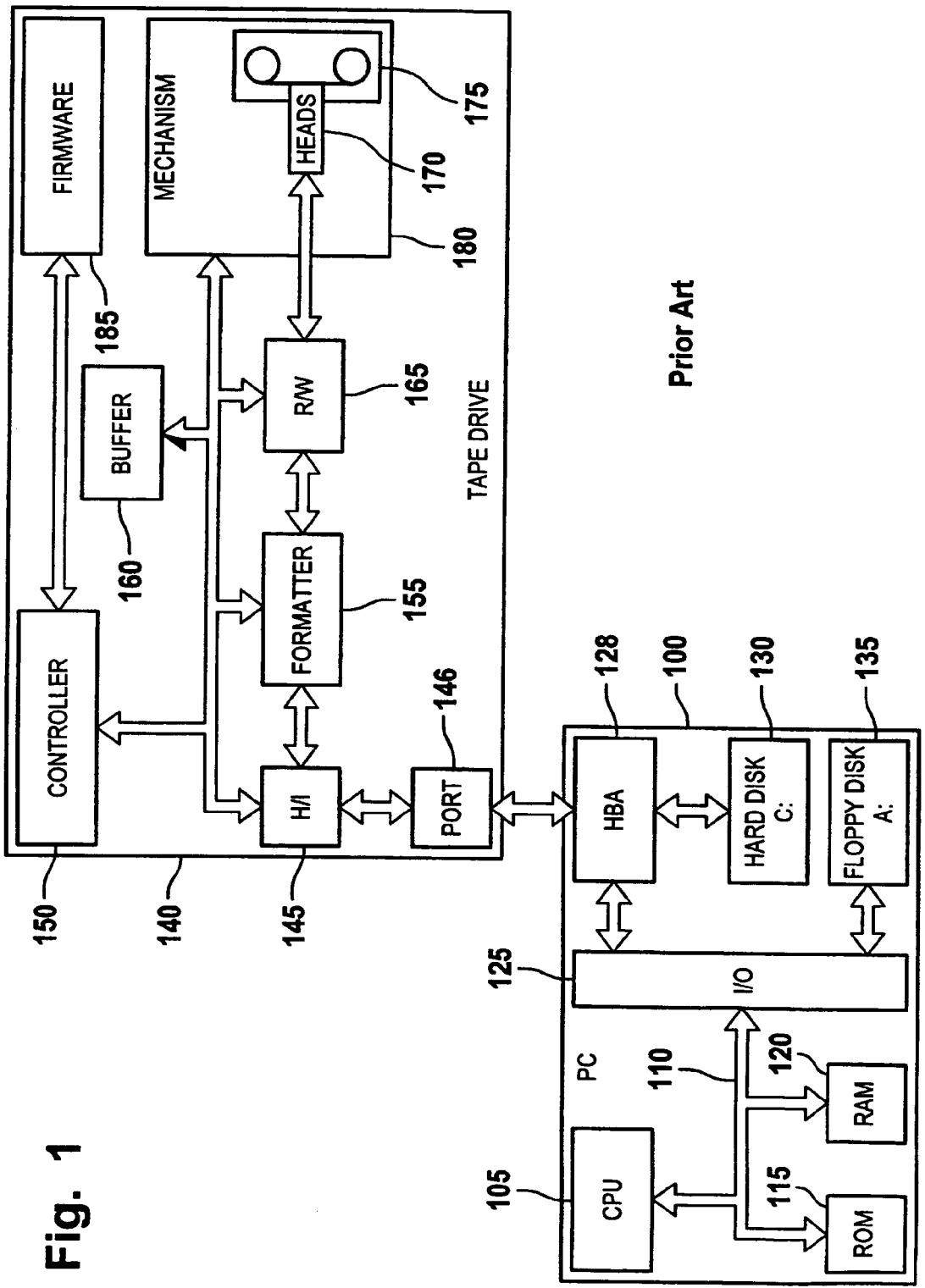
FIG. 1 is a schematic block diagram showing a prior art computer and tape drive.

In contrast to the prior art tape drive of FIG. 1, tape drive 640 has firmware 685 which permanently emulates the CD-ROM mode accessible at port 687. This way tape drive 640 permanently behaves as a tape drive when accessed at port 146 and it permanently behaves as a CD-ROM drive when accessed at port 687. The assignment of the CD-ROM emulation and the tape drive mode to the ports may be user selectable.

PC 100 has a storage interface controller. In the preferred embodiment considered here the storage interface controller is a SCSI HBA 128 that is coupled to both ports 146 and 687 of tape drive 640. Alternatively an iSCSI or SAS HBA can be used. When PC 100 boots and if there is no bootable data stored on hard disk drive 130 PC 100 will identify the CD-ROM drive which is emulated at port 687 as a bootable device. In response to the corresponding SCSI inquiry command received from PC 100 at port 687 firmware 685 will control tape drive 640 to provide bootable data stored on tape media 175 to PC 100 via port 687. Firmware 685 has corresponding instructions 686 for implementation of this functionality. It is to be noted that instead of a PC other types of computers can be used.

Figure 2:
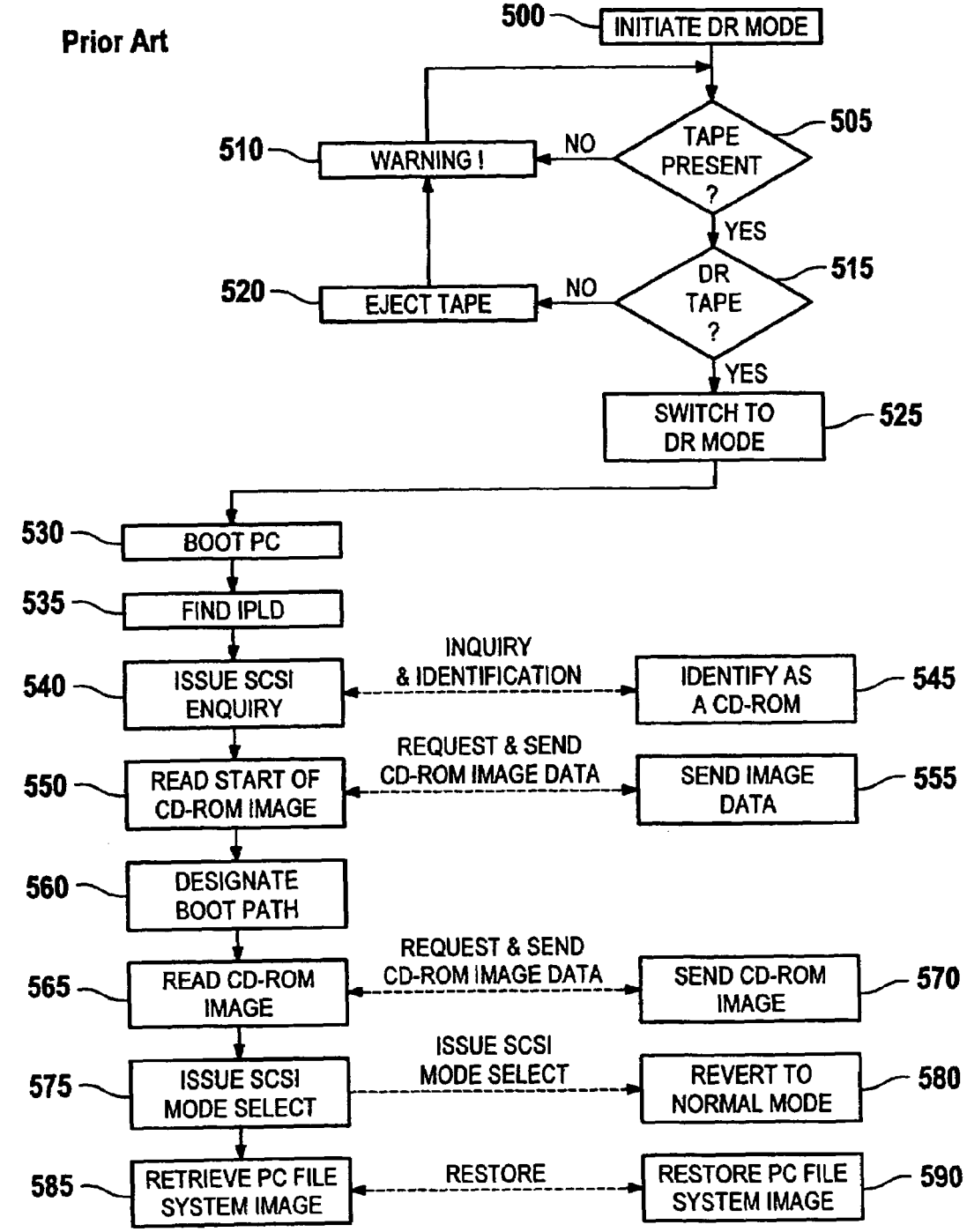
FIG. 2 is a flow diagram illustrating the steps involved in setting the tape drive of FIG. 1 into 'DR Mode' and booting a computer from the tape drive.

In contrast to the prior art tape drive of FIG. 1 and its operation as shown in FIG. 2, tape drive 640 does not require any manual intervention of the user to bring tape drive 640 into the disaster recovery mode. Rather both the tape drive and the emulated CD-ROM drive will persistently appear as separate LUNs at ports 146 and 687, respectively. In particular this avoids steps 500 to 525 of the prior art method shown in FIG. 2.

This is particularly advantageous when tape drive 640 forms an integral part of a tape library. This is due to the fact that the present invention avoids that a user needs to press a button in order to bring the tape drive into the disaster recovery mode.

Figure 4:
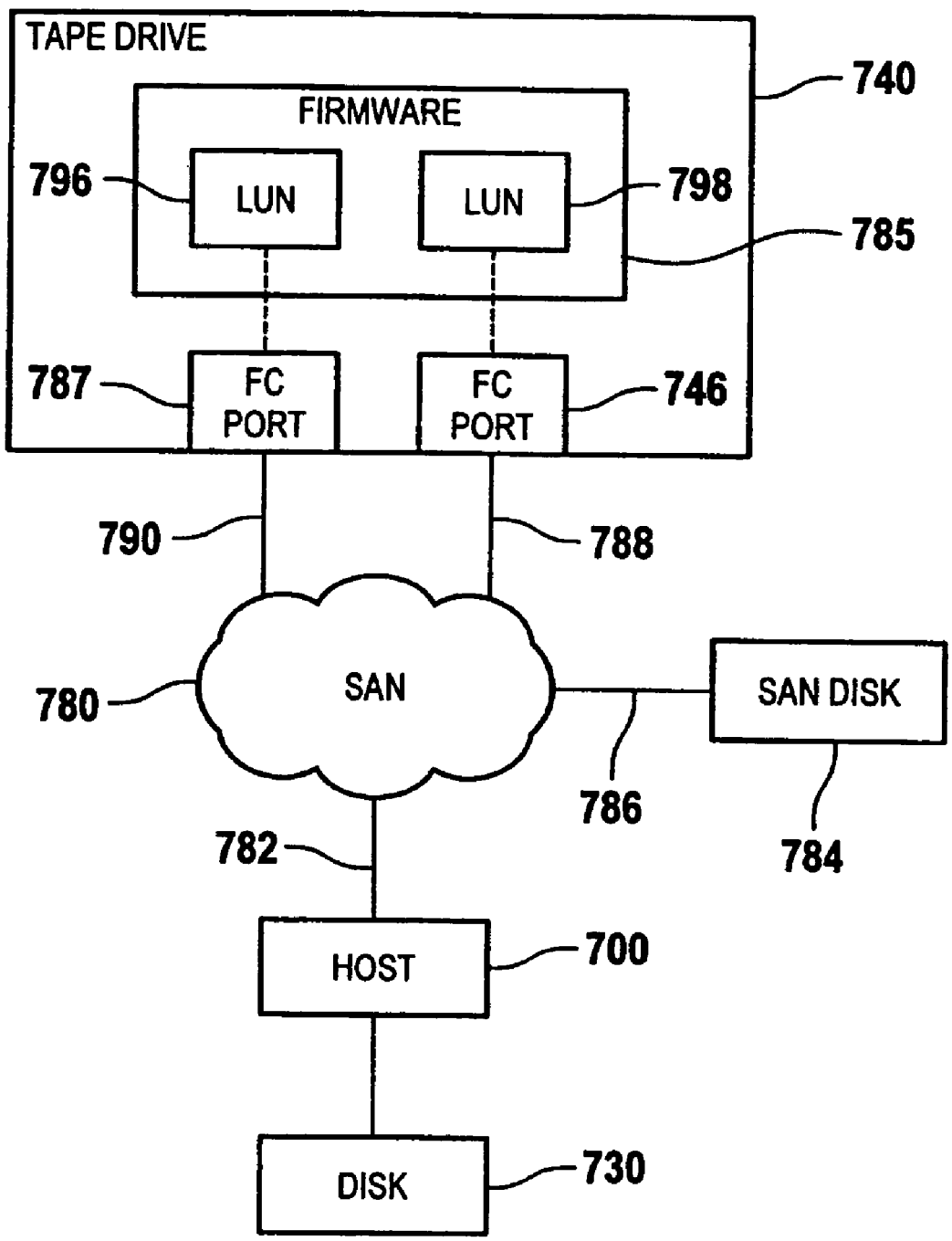
FIG. 4 is a schematic block diagram of another tape drive apparatus coupled to a storage area network.

FIG. 4 shows storage area network 780 to which host computer 700 is coupled by means of optical fibre 782. Further host computer 700 is coupled to hard disk 730.

SAN disk 784 is coupled to SAN 780 by means of optical fibre 786. SAN disk 784 can form part of a SAN disk array. Such SAN disks and SAN disk arrays are commercially available from Hewlett Packard and others, e.g. HP StorageWorks Modular SAN Array 1000. Both host computer 700 and SAN disk 784 have a FibreChannel compliant interface for communicating via SAN 780.

Tape drive 740 (similar to tape drive 640 of FIG. 3) is coupled to SAN 780 by means of optical fibres 788 and 790. Optical fibre 788 is coupled to physical port 746 and optical fibre 790 is coupled to physical port 787 of tape drive 740. Both physical ports 746 and 787 are compliant with the Fibre-Channel protocol or with another convenient and appropriate protocol.

Tape drive 740 has firmware 785 that has instructions 796 and instructions 798. Instructions 796 provide a LUN for operating tape drive 740 in the normal tape drive mode. Instructions 798 permanently emulate the CD-ROM mode and provide a corresponding LUN.

Physical port 787 of tape drive 740 is assigned to the LUN provided by instructions 796 such that tape drive 740 behaves like a normal tape drive at its physical port 787. At physical port 746 tape drive 740 appears as a CD-ROM as physical port 746 is assigned to the LUN provided by instructions 798 that permanently emulate a CD-ROM.

When host computer 700 boots, it checks its local hard disk 730 for the presence of a boot image. If such bootable data is not found on local hard disk 730 host computer 700 checks SAN disk 784 via SAN 780 for the presence of a boot image. If such a boot image is also not found on SAN disk 784 host computer 700 goes on and checks the emulated CD-ROM device at physical port 746 for the presence of a boot image. In the event that bootable data is stored on tape media presently inserted in tape drive 740 the bootable data is provided at physical port 746 which enables host computer 700 to boot from tape drive 740.

The SAN 780 can be configured such that, the port 746 emulating the CD-ROM drive is available to a different set of host computers to boot from it, while the "standard" tape drive port 787 is available to other hosts to maintain data path security and ensure appropriate device configuration on those hosts that utilise it as a tape device.

For example the SAN 780 can be configured such that only one host computer is able to access tape drive 740 as a tape drive and is allowed to write to it and is thus able to write a CD-boot image to a tape media inserted in tape drive 740 while a plurality of other host computers are able to "see" tape drive 740 as a CD-ROM drive and are thus able to boot from tape drive 740 and restore an operating system as part of a disaster recovery process.

Figure 5:
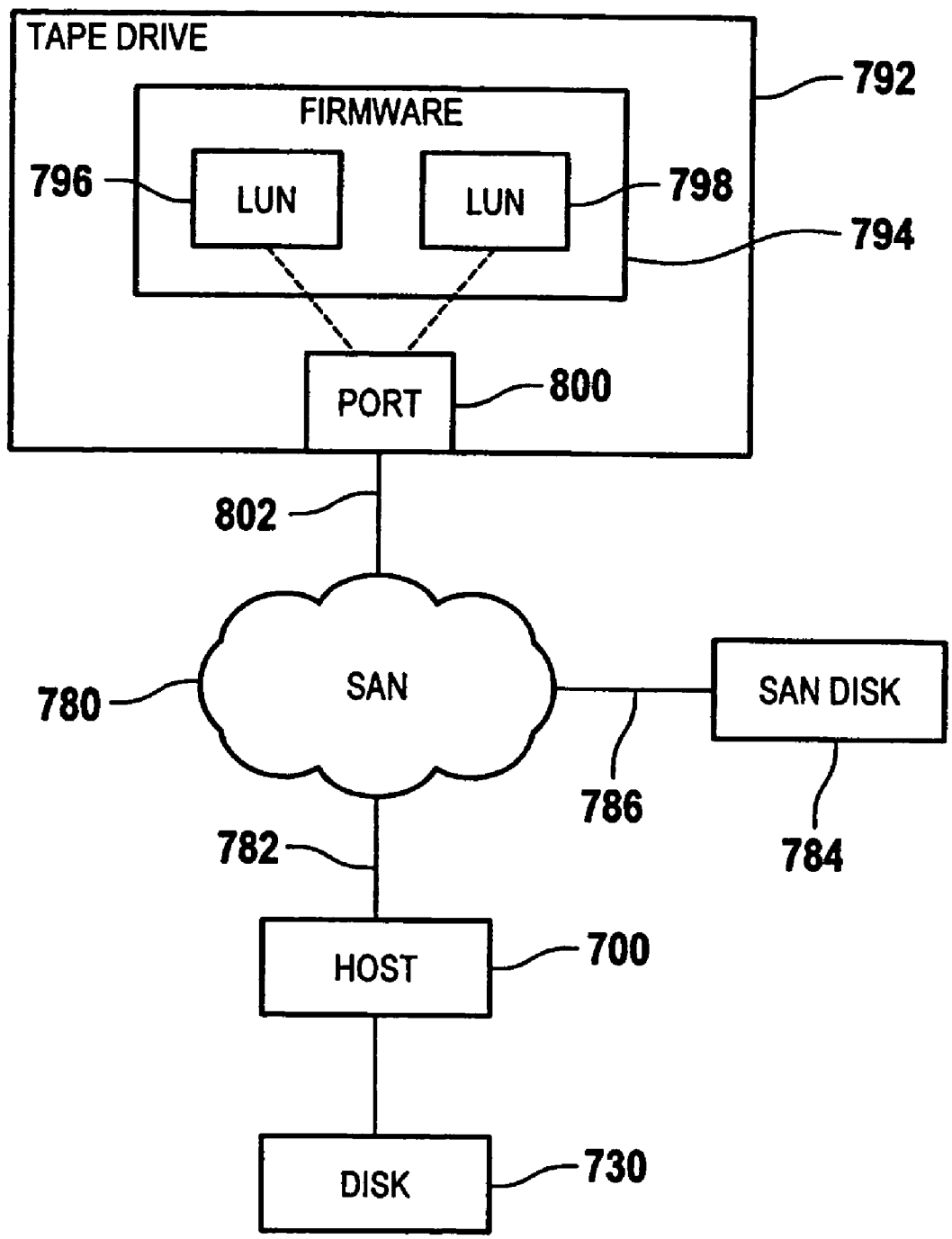
FIG. 5 is a schematic block diagram including still another tape drive apparatus having LUNs for the tape drive and the CD-ROM emulation mode.

FIG. 5 shows an alternative embodiment of a tape drive apparatus. Tape drive 792 has firmware 794. Similar to the embodiment of FIG. 4 firmware 794 has instructions 796 and 798. Instructions 796 provide a LUN for operation of tape drive 792 in the normal tape drive mode. Instructions 798 permanently emulate the CD-ROM mode and provide a corresponding LUN. Tape drive 792 is coupled to SAN 780 by means of cable 802 which may be an optical fibre in compliance with the fibre channel standard, a copper cable or another appropriate connector. Cable 802 is connected to tape drive 792 at its physical port 800. Physical port 800 enables access to both the LUN provided by instructions 796 and to the LUN provided by instructions 798.

When host computer 700 sends an inquiry command to physical port 800 the CD-ROM emulation provided by instructions 798 responds and provides the boot image stored on the tape media inserted in tape drive 792 to host computer 700 via physical port 800, cable 802, SAN 780 and optical fibre 782. At the same time another host computer (not shown in FIG. 5) that is coupled to SAN 780 may communicate via physical port 800 with the LUN provided by instructions 796 in the normal tape drive mode. Each LUN, or logical port, is accessible as a port by an external device. Clearly, an external device also needs a physical port to access a LUN. The unqualified term "port" in its broadest sense as used herein means a logical unit, a physical port, or a combination thereof.

| List of reference numerals | |
|---|---|
| 100 | personal computer (PC) |
| 105 | central processing unit (CPU) |
| 110 | bus |
| 115 | read only memory (ROM) |
| 120 | random access memory (RAM) |
| 125 | I/O sub-system |
| 128 | SCSI HBA |
| 130 | hard disk drive |
| 135 | floppy disk drive |
| 140 | tape drive |
| 145 | host interface |
| 146 | port |
| 150 | controller |
| 155 | formatter |
| 160 | buffer |
| 165 | read/write block |
| 170 | read/write heads |
| 175 | tape media |
| 180 | tape mechanism |
| 185 | firmware |
| 640 | tape drive |
| 685 | firmware |
| 687 | physical port |
| 730 | hard disk |
| 740 | tape drive |
| 746 | physical port |
| 780 | storage area network (SAN) |
| 782 | optical fibre |
| 784 | SAN disk |
| 785 | firmware |
| 786 | optical fibre |
| 787 | physical port |
| 788 | optical fibre |
| 790 | optical fibre |
| 792 | tape drive |
| 794 | firmware |
| 796 | instructions |
| 798 | instructions |
| 800 | physical port |
| 802 | cable |

The invention claimed is:

1. A tape drive apparatus comprising:
   a data transfer apparatus for transferring data to and from a tape media loaded in the tape drive apparatus,
   a first port for communicating with the data transfer apparatus in a tape drive mode,
   a second port for communicating with the data transfer apparatus in an optical storage device mode, and
   an emulation apparatus for permanently emulating an optical storage device at the second port for enabling an external device to access the data transfer apparatus, via the second port, in the optical storage device mode.

2. The tape drive apparatus of claim 1, wherein the optical storage device mode is compatible with a CD format and/or a DVD format.

3. The tape drive apparatus of claim 1, the emulation apparatus comprising emulation firmware for emulating the optical storage device.

4. The tape drive apparatus of claim 1, wherein the first and second ports comprise separate first and second physical ports, respectively, the second physical port being operatively coupled to the emulation apparatus.

5. The tape drive apparatus of claim 4, wherein each of the physical ports is adapted to be coupled to a host bus adaptor.

6. The tape drive apparatus of claim 1, comprising a common physical port, wherein each of the first and second ports is a logical port, and both of the logical ports are accessible through said common physical port.

7. The tape drive apparatus of claim 1, the first and second ports being compliant with a fibre channel standard for coupling of the first and second ports to a storage area network (SAN).

8. A computer-readable physical medium storing therein a computer program for controlling operation of a tape drive, the tape drive having first and second ports, the computer program comprising instructions executable by a processor for permanently providing a tape drive interface at the first port and for permanently providing an optical storage device interface at the second port.

9. The computer-readable physical medium of claim 8, the optical storage interface being compliant with a CD and/or a DVD standard.

10. The computer-readable physical medium of claim 8, the instructions being executable by the processor to read bootable data from a tape media loaded in the tape drive in response to an inquiry command received at the second port.

11. A non-volatile memory component comprising firmware for controlling a tape drive, the tape drive having first and second ports, the firmware comprising instructions executable by a processor for providing a tape drive interface at the first port and for permanently providing an optical storage device interface at the second port.

12. A tape library, comprising a plurality of tape drives, at least one of the tape drives having a first port for providing a tape drive interface and a second port for permanently providing an optical storage device interface.

13. A tape drive, comprising a first port for providing a tape drive interface and a second port for permanently providing an optical storage device interface, and instructions executable by a processor to provide bootable data read from a tape media loaded in the tape drive in response to an inquiry command received at the second port.

14. A tape drive apparatus comprising:
- a data transfer apparatus for transferring data to and from a tape media loaded in the tape drive apparatus,
- first and second logical units, and
- at least one physical port for communication with the data transfer apparatus,
- the first logical unit providing a tape drive mode at said at least one physical port for enabling an external device to access the data transfer apparatus as a tape drive,
- the second logical unit providing a permanent emulation of an optical storage device at said at least one physical port for enabling the or another external device to access the data transfer apparatus as an optical storage device.

15. The tape drive of claim 13, the first port permanently providing the tape drive interface.

16. The tape drive apparatus of claim 14, further comprising firmware having first instructions for providing the first logical unit and second instructions for providing the second logical unit.

17. The tape drive apparatus of claim 14, wherein said at least one physical port consists of a single physical port which provides access to both said first and second logical units.

18. The tape drive apparatus of claim 14, the first logical unit permanently providing the tape drive mode at said at least one physical port.

* * * * *